United States Patent
Fengel et al.

(10) Patent No.: US 7,588,266 B2
(45) Date of Patent: Sep. 15, 2009

(54) PROTECTIVE DEVICE FOR VEHICLE OCCUPANTS

(75) Inventors: Paul-Dieter Fengel, Eberdingen (DE); Roland Bühner, Fellbach-Schmiden (DE)

(73) Assignee: Dr. Ing. h.c.F. Porsche AG, Weissach (DE)

( * ) Notice: Subject to any disclaimer, the term of this patent is extended or adjusted under 35 U.S.C. 154(b) by 358 days.

(21) Appl. No.: 11/501,520

(22) Filed: Aug. 9, 2006

(65) Prior Publication Data

US 2007/0057499 A1    Mar. 15, 2007

(30) Foreign Application Priority Data

Sep. 13, 2005    (DE) .................. 10 2005 043 768

(51) Int. Cl.
*B60R 21/02* (2006.01)
*B60R 21/11* (2006.01)

(52) U.S. Cl. .............. 280/748; 280/749; 296/24.43
(58) Field of Classification Search .......... 280/748, 280/749; 296/24.43
See application file for complete search history.

(56) References Cited

U.S. PATENT DOCUMENTS

| | | | |
|---|---|---|---|
| 5,632,520 A | | 5/1997 | Butz |
| 6,390,526 B1 * | | 5/2002 | Ament et al. ............ 296/37.16 |
| 6,443,489 B1 * | | 9/2002 | Ehrenberger et al. ........ 280/749 |
| 6,598,921 B2 * | | 7/2003 | Seel et al. ................ 296/24.43 |
| 7,059,646 B1 * | | 6/2006 | DeLong et al. ........... 296/24.43 |
| 7,086,678 B2 | | 8/2006 | Schlecht |
| 7,118,152 B2 * | | 10/2006 | Cucknell et al. ......... 296/37.16 |
| 7,163,251 B2 * | | 1/2007 | Sitzler et al. .............. 296/37.8 |
| 7,281,742 B2 * | | 10/2007 | Porter et al. .............. 296/24.4 |
| 2007/0013201 A1 * | | 1/2007 | Wagner et al. .......... 296/24.43 |

FOREIGN PATENT DOCUMENTS

| | | |
|---|---|---|
| DE | 41 28 554 A1 | 3/1992 |
| DE | 44 38 910 C1 | 3/1996 |
| DE | 200 16 205 U1 | 12/2000 |
| DE | 100 46 142 A1 | 4/2002 |
| DE | 103 54 882 A1 | 6/2005 |
| EP | 1 473 199 A2 | 11/2004 |
| FR | 2 860 200 | 4/2005 |
| GB | 2 310 173 A | 8/1997 |

* cited by examiner

*Primary Examiner*—Paul N. Dickson
*Assistant Examiner*—Joselynn Y. Sliteris

(57) ABSTRACT

A protective device for vehicle occupants of a motor vehicle contains a restraining element and a connecting device for the restraining element in order to be able to connect the latter releasably to the motor vehicle and to be able to hold it in a use position. The connecting device contains for this purpose an upper and lower fastening device. In order, in particular, to optimize the operation of the protective device, the lower fastening device has, on the one hand, a locking device which locks the restraining element in the rest position, and, on the other hand, a clamping device which keeps the restraining element clamped—with respect to the upper fastening device—in the use position.

17 Claims, 4 Drawing Sheets

PROTECTIVE DEVICE FOR VEHICLE OCCUPANTS

BACKGROUND OF THE INVENTION

Field of the Invention

The invention is based on a protective device for protecting occupants of a vehicle. The protective device has a restraining element which can be disposed between a vehicle seat and a vehicle interior space situated behind it and serving to receive a load, and which can optionally be pivoted into an upright use position and a lockable rest position. The protective device further has a connecting device for a restraining element in order to be able to connect the latter releasably to the motor vehicle and to be able to hold it in the use position. The connecting device contains for this purpose an upper and lower fastening device, of which the upper fastening device is assigned to a vehicle roof and the lower fastening device permits the pivoting of the restraining element and is assigned to the vehicle seat.

A protective device of the generic type and which is also referred to as a partition can be seen in published, non-prosecuted German patent application DE 41 28 554 A1. The partition forms a restraining element for a load, so that, in the case of a severe braking operation or an accident of the vehicle, the load is held back and does not put the vehicle occupants at risk. Accordingly, the restraining element can be disposed between at least one vehicle seat and a loading space, which is situated behind it and is assigned to the vehicle interior space, in such a manner that it protrudes, at least in an upright use position, over the back rest of the vehicle seat and, in particular, reaches to below the vehicle roof. The restraining element can also be shifted into a folded-down rest position where it can be locked in place. In order to be able to transfer the restraining element from the rest position into the use position and vice versa, it is mounted on a back rest about a pivot axis which therefore constitutes a lower fastening device for the restraining element. In addition, an upper fastening device is provided in order to keep the restraining element in the region of the vehicle roof in the use position. The lower and upper fastening devices are parts of a connecting device which is used in order to be able to fit the restraining element into and remove it from the motor vehicle as required.

SUMMARY OF THE INVENTION

It is accordingly an object of the invention to provide a protective device for vehicle occupants which overcomes the above-mentioned disadvantages of the prior art devices of this general type, and which has an optimized fastening device.

With the foregoing and other objects in view there is provided, in accordance with the invention, a protective device for vehicle occupants of a motor vehicle. The protective device includes a restraining element to be disposed between a vehicle seat and a vehicle interior space situated behind the vehicle seat. The restraining element serves to receive a load, and can be pivoted into an upright use position and a lockable rest position. A connecting device is disposed on the restraining element. The connecting device connects the protective device releasably to the motor vehicle and holds the protective device in the upright use position. The connecting device includes an upper fastening device and a lower fastening device. The upper fastening device is assigned to a vehicle roof and the lower fastening device permits a pivoting of the restraining element and is assigned to the vehicle seat. The lower fastening device has a locking device for locking the restraining element in the lockable rest position and a clamping device for keeping the restraining element clamped with the upper fastening device, in the upright use position.

The advantages primarily obtained with the invention are to be seen in the fact that the integration of a locking device for the rest position of the restraining element in the lower fastening device provides a simplified and comfortable operation of the protective device. In addition, a compact construction is produced because the lower fastening device combines the locking device and the clamping device. Furthermore, the restraining element can be securely fastened with the clamping device, with, moreover, a certain tolerance compensation being provided by the clamping device if the distance between upper and lower fastening devices varies.

The safety device is preferably used for a motor vehicle which has, behind the vehicle seats, a rear parcel shelf which can be adjoined to the rear by a loading space. The motor vehicle is preferably configured as a two-seater. In this respect, it is advantageous if the restraining element can take up the approximately horizontal rest position on the rear parcel shelf.

The clamping device can be realized in a simple manner, with a clamping element which is movable counter to the force of a spring device. The restraining element can therefore be clamped in place between the upper and lower fastening devices.

In order to be able to permit the restraining element to be clamped in place, the first fitting of the lower fastening device forms an abutment for the clamping device.

In a further embodiment of the invention, the clamping element can be used as a securing device of the locking device. The clamping device can accordingly have a dual function in which it first permits the restraining element to be clamped in place in the use position and second permits a secure locking in the rest position. If the locking device has an interlocking connection between the two fittings of the lower fastening device, the clamping element can secure the interlocking connection.

Particularly simple operation of the lower fastening device, which has the clamping device and the locking device, is possible. The lock has a movable handle for actuating the clamping element, such that the clamping device is optionally movable counter to the spring device into a release position, in which the clamping device partially protrudes out of the lock housing, and into a locking position, in which the clamping element is pulled into the lock housing by the spring device. As a result of which the restraining element is kept clamped in the upright use position or is locked in the lockable rest position by the locking device.

Other features which are considered as characteristic for the invention are set forth in the appended claims.

Although the invention is illustrated and described herein as embodied in a protective device for vehicle occupants, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
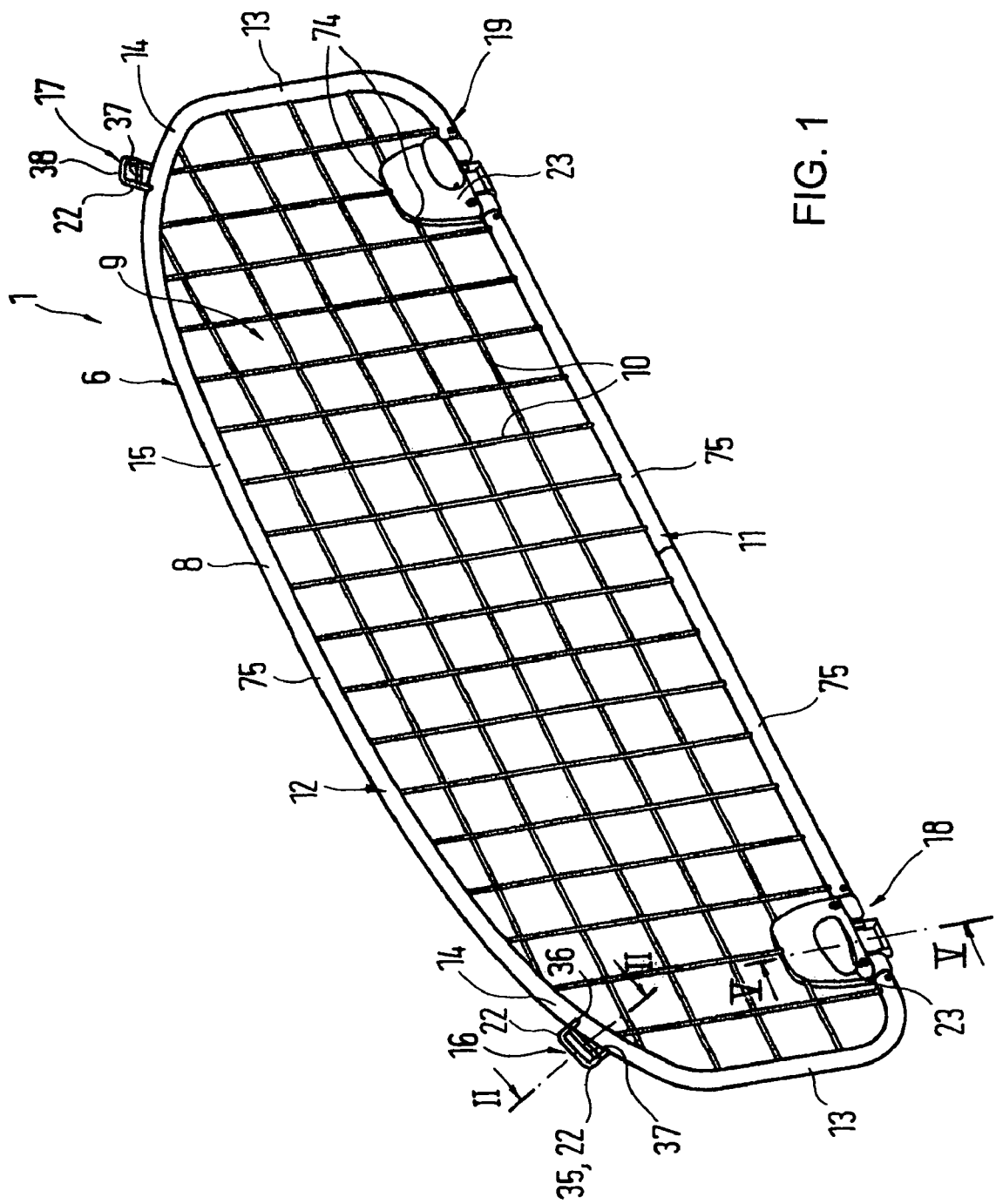
FIG. 1 is a diagrammatic, perspective view of a protective device according to the invention.

Referring now to the figures of the drawing in detail and first, particularly, to FIG. 1 thereof, there is shown a protective device 1 for occupants of a motor vehicle KF (see FIGS. 2 and 5), which is otherwise not illustrated specifically. The protective device 1 is also referred to as a partition, separating net, blocking device, restraining device or the like. It serves to hold back a non-illustrated load, which is being conveyed or carried along in a loading space or luggage compartment or trunk 2 (FIG. 5) of the motor vehicle. The protective device 1 is provided in the trunk 2 in order to prevent the load from penetrating a passenger car compartment 3 if the motor vehicle KF is sharply braked or is involved in an accident. The passenger compartment 3 and the trunk 2 are parts of a vehicle interior space of the motor vehicle. However, the function of a protective device 1 of this type is known and so is not entered into in further detail.

Figure 5:
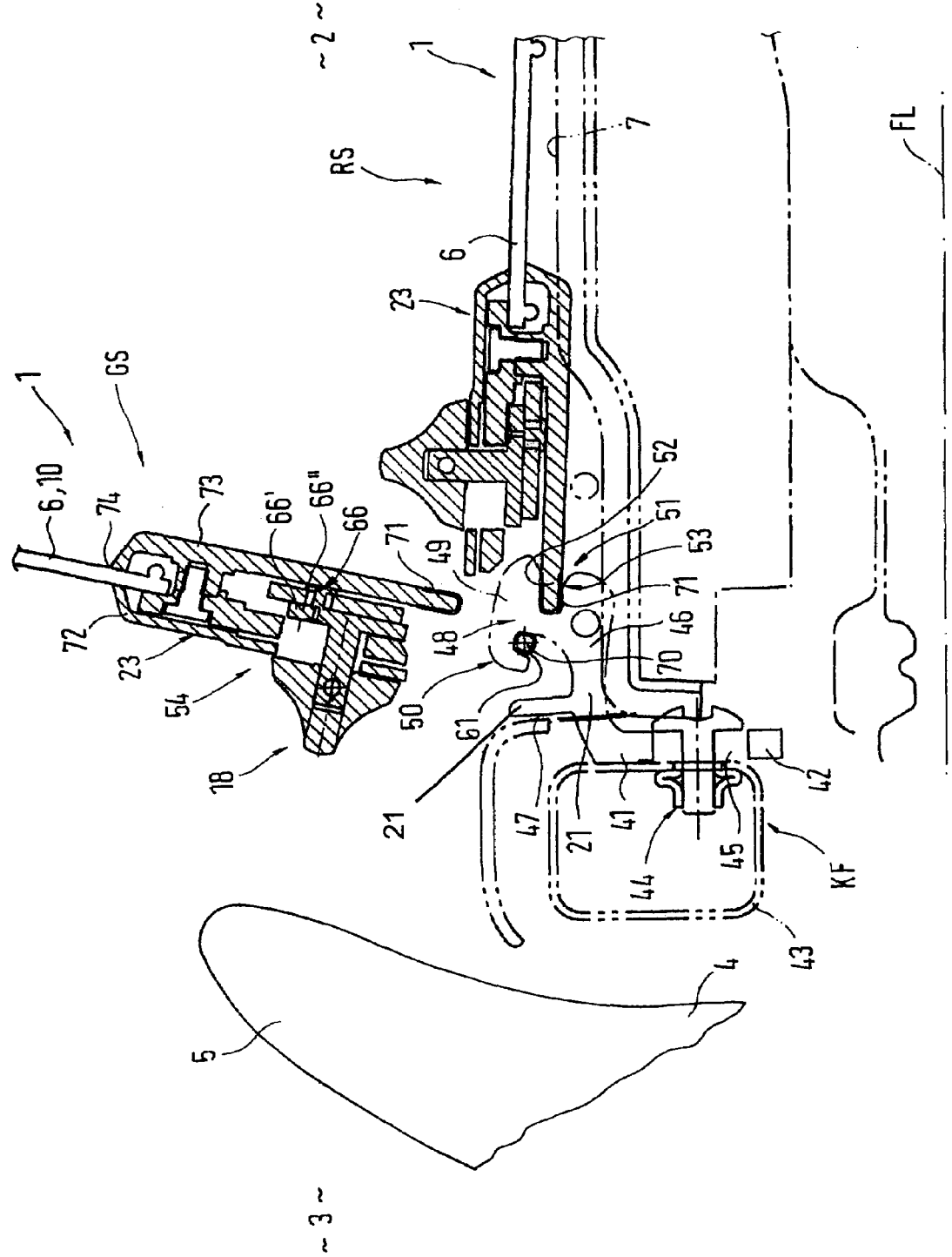
FIG. 5 is a diagrammatic, sectional view through the lower fastening device taken along the line V-V shown in FIG. 1, with the protective device being shown both in a use position and in a rest position.

Accordingly, the protective device 1 is fastened behind at least one vehicle seat which is disposed in the passenger compartment 3 and of which only a backrest 4, optionally with an integrated head restraint 5, can be seen in FIG. 5. The protective device 1 is consequently situated between the vehicle seat or the passenger compartment 3 and the trunk 2 and separates the two spaces 2 and 3 from each other. For this purpose, the protective device 1 has a restraining element 6 which extends transversely in the vehicle interior space, preferably over virtually the entire width thereof, and which, in order to be able to deploy a protective effect, can be shifted into an upright use position GS (FIG. 5) and into a folded-down, in particular approximately horizontal, rest position RS in which it is deposited adjacent to or on a rear parcel shelf 7. In the exemplary embodiment shown, the restraining element 6 is configured as a framed lattice with a lattice structure 9 surrounded by a frame 8. Alternatively, use could also be made of a continuous, planar wall, for example made from Plexiglas. The lattice structure 9 can be produced from wires 10 or a net or mesh, which are connected to a rigid frame 8. The restraining element 6 is matched to the cross section of the vehicle interior space and, in the exemplary embodiment, has a contour of a D which lies on its back 11 and the arch 12 of which, which spans the back, has lateral, upright sections 13 which merge via oblique sections 14 into a section 15 running parallel to the back 11.

In order to be able to fasten the protected device 1 releasably in the vehicle interior space, a connecting device is provided which has a plurality of fastening devices 16, 17, 18 and 19 which are distributed around the circumference of the frame 8. With reference to the upright use position GS of the restraining element 6, at least one upper fastening device 16 or 17 and at least one lower fastening device 18 or 19 are provided. In the exemplary embodiment illustrated, two upper fastening devices 16 and 17 are positioned on the arch 12, in particular on the oblique sections 14, and two lower fastening devices 18 and 19 are positioned on the back 11, in particular adjacent to the upright sections 13. All of the fastening devices 16 to 19 have first fittings 20 or 21 (FIGS. 2 and 5) which are connected fixedly to the motor vehicle KF, and second fittings 22 or 23 which are assigned to the restraining element 6. The upper fastening devices 16 and 17 are of essentially identical construction; the same applies to the lower fastening devices 18 and 19. Only the upper fastening device 16, with reference to FIGS. 1 and 2, and the lower fastening device 18, with respect to FIGS. 3 to 5, are therefore explained in more detail below.

Figure 2:
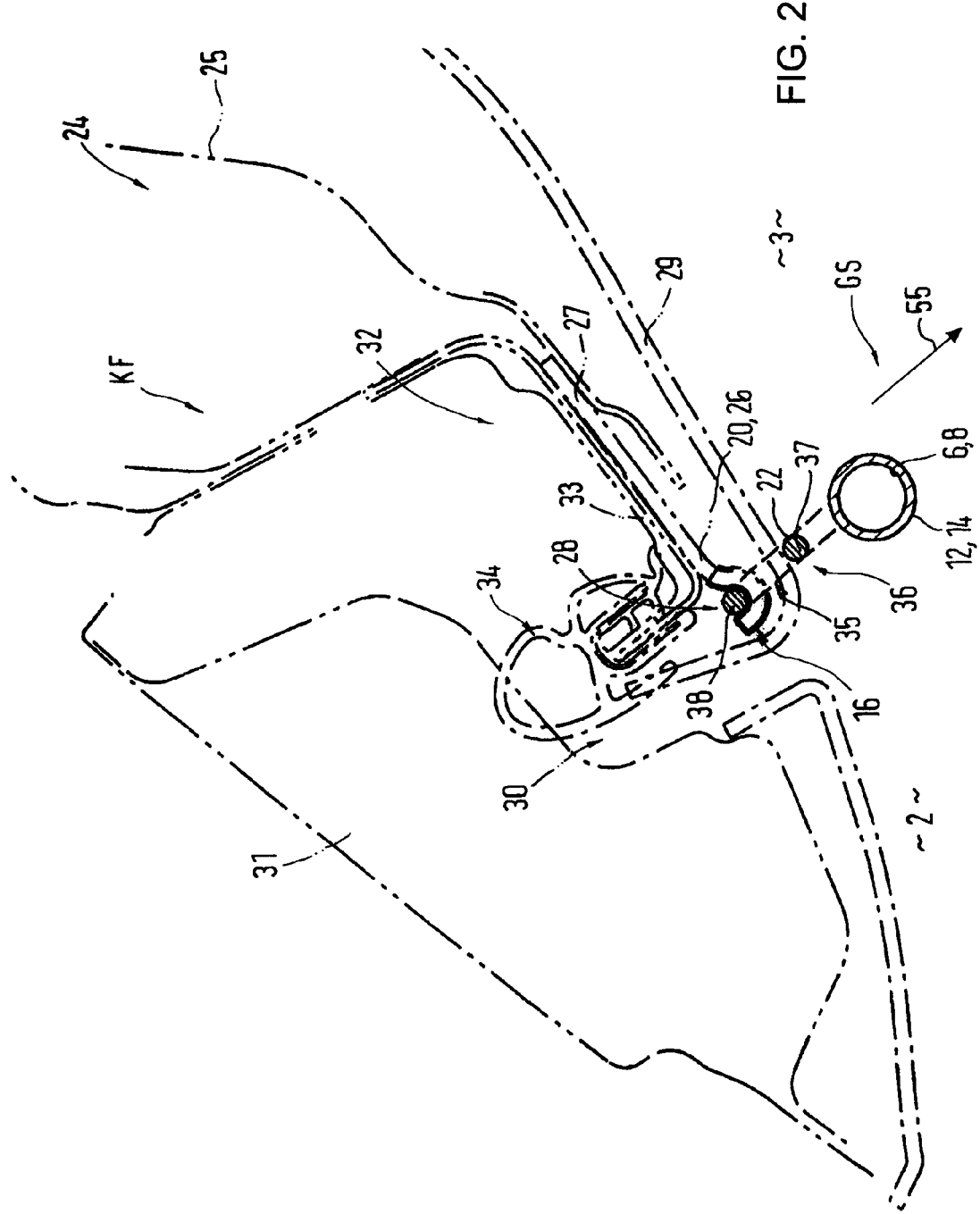
FIG. 2 is a diagrammatic, sectional view taken along the line II-II of the protective device shown in FIG. 1.

FIG. 2 shows a section through the protective device 1 in the region of the upper fastening device 16 which is assigned to a vehicle roof 24 of the motor vehicle KF. In the section of the vehicle roof 24, a roof frame 25 can be seen to which the first fitting 20 is fastened. The latter is configured as a suspension device 26 and has a strip-shaped connecting section 27 which is fastened to the inside of the roof frame 25. Furthermore, the first fitting 20 contains a hook section 28 which stands freely and is bent in an approximately U-shaped manner. The roof frame 25 is provided with an interior lining part 29 which is recessed in the region of the hook element 28, so that the connecting section 27 cannot be seen or is screened. In addition, the roof frame 25 bounds a body opening 30 into which is inserted a tailgate 31 via which access to the trunk 2 situated below it is provided. Moreover, the roof frame 25 has a "ceiling channel" 32 which is formed by an end edge 33 of the roof frame 25. At its free, upwardly bent end, the end edge 33 has a seal 34 for the rear flap 31. The suspension device 26 is fastened to the end edge 33.

The second fitting 22 of the upper fastening device 16 is configured as a eye 35 which can be hooked into the hook section 28 and starts from the frame 8 of the restraining element 6. The eye 35 is formed by a U-shaped clip 36, the free limb ends of which are mutually connected to the frame 8. A transverse web 37 which runs approximately parallel to a base 38 of the U-shaped clip 36 can also be inserted into the clip 36. In the use position GS of the restraining element 6, the eye 35 is fitted together with the base 38 of the clip 36 into the hook section 28.

Figure 3:
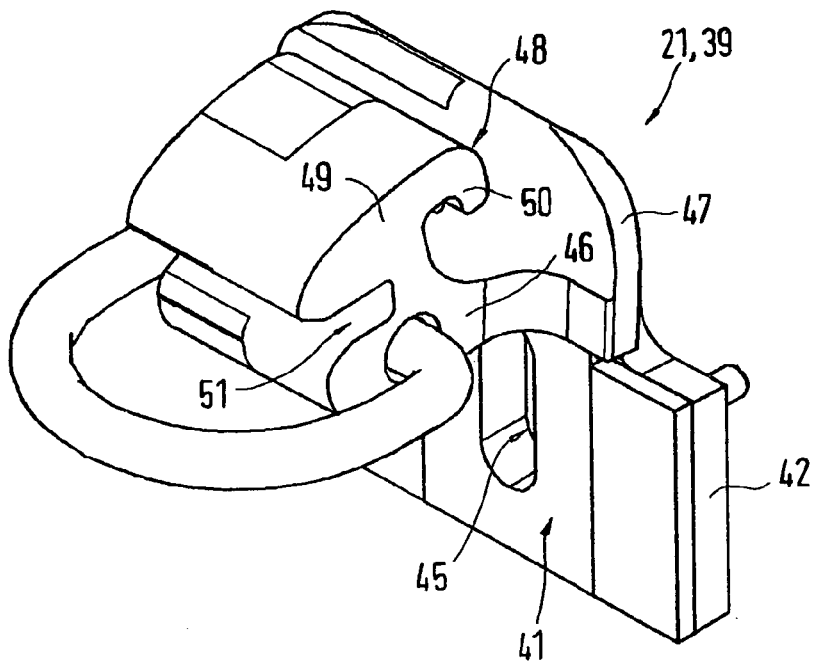
FIG. 3 is a diagrammatic, perspective view of a first fitting of a lower fastening device of the protective device.
Figure 4:
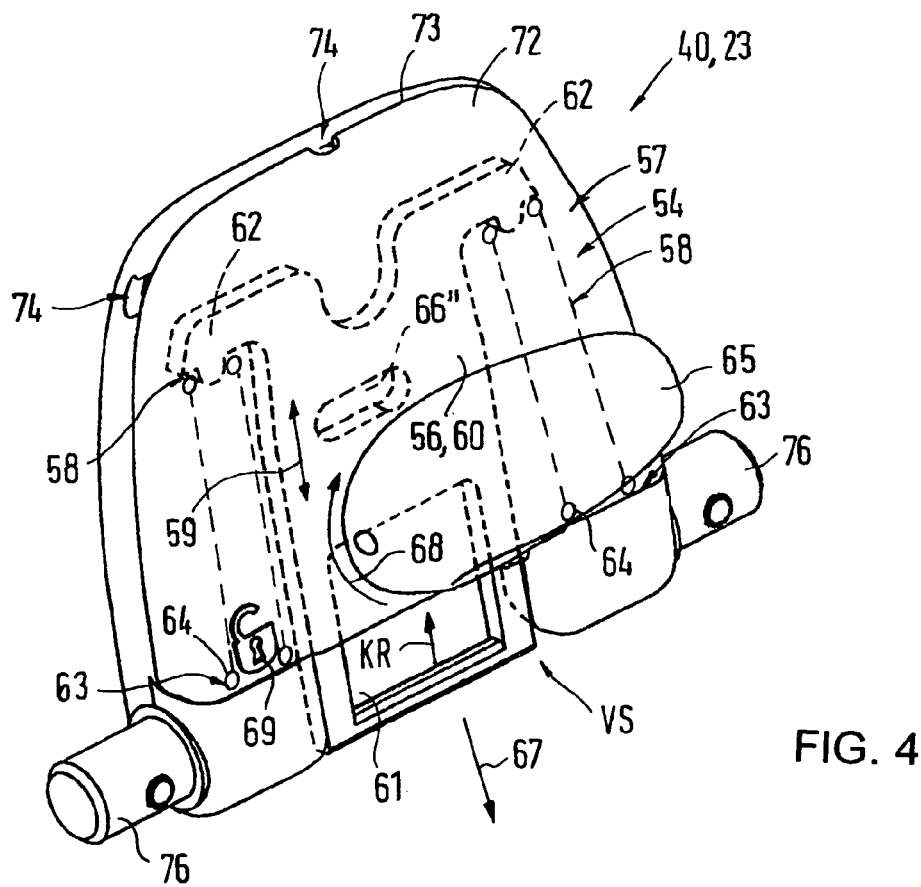
FIG. 4 is a diagrammatic, perspective view of a second fitting of the lower fastening device.

The lower fastening device 18 according to FIGS. 3 to 5 is composed of the first fitting 21, which is configured as a bearing bracket 39, and the second fitting 23, which is configured as a lock 40. The bearing bracket 39 has—as seen in cross section—an angled piece 41, an upright fastening limb 42 of which is used for securely attaching the bearing bracket 39 to the motor vehicle KF, in particular to a transverse support 43. The transverse support 43 extends between B-pillars (not illustrated here) of the body of the motor vehicles KF and lies behind the vehicle seat with the backrest 4. The transverse support 43, which is realized in particular as a hollow profile, serves to stiffen the body of the motor vehicle KF during a side impact; it is therefore suitable for the secure fastening of the first fitting 21. This fastening can be of non-releasable or—as illustrated—of a relaseable design, for which use is made, for example, of a screw connection 44 which reaches through the fastening limb 42 in an elongated hole 45 oriented approximately vertically. The angled piece 41 furthermore contains a supporting limb 46 which runs approximately horizontally, extends in the direction of the trunk 2, i.e. to the rear, has an upwardly directed web 47 and, behind the latter, an approximately T-shaped head piece 48, which head piece 48 is used for the connection of the second fitting 23, namely the lock 40. A transverse element 49 of the head piece 48 is aligned approximately parallel to the longitudinal axis FL of the vehicle and, by use of a first extension which is directed toward the backrest 4 and downward, forms a hook 50 on which the second fitting 23 can be hooked. A second, rearwardly directed extension of the transverse element 49 forms, together with the supporting limb 46, a receptacle 51 for an engagement element 52 of a locking device 53 of the lower fastening device 18 which locks the restraining elements 6 in the rest position RS to be seen in FIG. 5, which is discussed in more detail further below.

Apart from the locking device 53, the lower fastening device 18 also has a clamping device 54, the abutment of which is formed by the first fitting 21, in particular its headpiece 48, with the result that, in the use position GS, the restraining element 6 can be kept clamped—with respect to the upper fastening device 16—or can be clamped between the upper and lower fastening devices 16 and 18. A clamping force supplied by the clamping device 54 is indicated in FIG. 2 by an arrow 55 which—starting from the upper fastening device 16—is oriented in the direction of the lower fastening device 18.

The clamping device 54 is equipped with a clamping element 56 which is mounted in a lock housing 57 of the lock 40 in a manner such that it can be displaced counter to the force of a spring element 58 in the double arrow direction 59. The clamping element 56 is configured as a flat slide 60 which, at its end projecting out of the lock housing 57, has an aperture as eye 61 which can be brought into engagement with the hook 50 of the bearing bracket 39, as can be seen in FIG. 5. At its other end, the slide 60 has at least one lateral spring arm 62 between which and a counter bearing 63 in the lock housing 57, a spring 64 of the spring device 58 is inserted. The spring 64 is preferably configured as a helical spring. It is possible, as shown, for two spring arms 62 and correspondingly two springs 64 and also two counterbearings 63 to be provided for the spring device 58. A force KR applied by the spring device 58 pulls the clamping element 56 into the lock housing.

In order to be able to bring the restraining element 6 into the use position GS, the clamping element 56 can be hooked by its eye 61 into the hook 50. Subsequently, the restraining element 6 can be pulled by hand counter to the arrow of direction 55, i.e. in the direction of the upper fastening device 16, as a result of which the clamping element 56 is pulled out of the lock housing 57 counter to the force of the spring device 58 until the eye 35 of the upper fastening device 16 can be hooked by the hook section 28 into the suspension device 26 provided for it.

However, an embodiment of the lock 40 with a movable handle 65, which is configured as a rotary lever and is mounted in the lock housing 57, is preferred. The handle 65 acts with a coupling device 66, for example an eccentric device 66', on the slide 60 or the clamping element 56 in an interlocking manner, for example engaging in a recess 66" on the slide 60, in such a manner that the slide 60 is shifted counter to the force of the spring device 58 into a release position partially projecting out of the lock housing 57, so that the eye 61 formed on the slide 60 protrudes over the lock housing 57 (arrow direction 67) and can readily be hooked into the hook 50 and also the upper eye 35 can be hooked in the hook section 28 of the upper fastening device 16. The handle 65 is then rotated again (arrow direction 68) into the position which is shown in FIG. 4 and which corresponds with the locking position VS of the slide 60, as a result of which the slide 60 is pulled again by the spring device 58 into the lock housing 57. The restraining element 6 is therefore clamped in the upper and lower fastening devices 16 and 18 in the use position GS. The release position of the slide 60 is assigned that position of the handle 65 which overlaps the opened lock symbol 69 (FIG. 4).

If the restraining element 6 is to be brought out of the use position GS into the rest position RS, the handle 65 is first of all rotated counter to the arrow direction 68, whereupon the slide 60 takes up its release position described above, subsequently, the upper eye 35 is unhooked from the hook section 28 and then the restraining element 6 is folded rearward about an imaginary pivot axis 70 in the direction of the rear parcel shelf 7. By rotation of the handle 65 back in the arrow direction 68 into the position shown in FIG. 4, the spring device 58 can pull the slide 60 back again into the lock housing 57, as a result of which the restraining elements 6 is pulled by its engagement element 52 into the receptacle 51 and the locking device 53 is thereby activated. In the locking position VS, the clamping element 56 or the slide 60 keeps the interlocking device acting between the first and second fittings 21 and 23 of the lower fastening device 18, namely receptacle 51 and engagement element 52, in engagement with each other and therefore forms a securing means for the locking device 53. If the locking device 53 is activated as just described, the restraining element 6 is blocked in the rest position RS and cannot be pivoted into the use position GS. In order to at least largely avoid noise, for example flapping, developing between the interlocking device, a damping coating 71 may also be applied to at least one of the interlocking device. The damping coating 71 is preferably assigned to the engagement element 52 and, in particular, is configured as a strip which can be stuck on and which surrounds the engagement element 52. As FIG. 5 also shows, the engagement element 52 starts as an extension from the lock housing 57 which can moreover be of two-part configured, so that the lattice structure 9 comes to lie between its housing parts 72 and 73. Corresponding recesses 74 can be provided on the edge of at least one of the housing parts 72 and 73 for the lattice structure 9.

In a preferred embodiment, the frame 8 is composed of one or more tube sections 75, it being possible for the second fittings 23 of the lower fastening devices 18 and 19 to be inserted between two tube sections 75 in the region of the back 11 and to be connected to the tube sections 75. For the connection between the second fitting 23 and the respective tube section 75, a coupling extension 76 is formed in each case on the fitting 23, onto which coupling extension the tube section 75 is fitted and is therefore connected fixedly. The coupling extensions 76 preferably start from the lock housing 57. Alternatively, the ends of the tube sections 75 could be inserted into corresponding tube receptacles (not shown) on the second fitting 23.

This application claims the priority, under 35 U.S.C. §119, of German application DE 10 2005 043 768.0, filed Sep. 13, 2005; the prior application is herewith incorporated by reference in its entirety.

We claim:

1. A protective device for vehicle occupants of a motor vehicle, the protective device comprising:
   a restraining element to be disposed between a vehicle seat and a vehicle interior space situated behind the vehicle seat, said restraining element serving to receive a load, and being pivotable between an upright use position and a lockable rest position; and
   a connecting device disposed on said restraining element, said connecting device connecting said protective device releasably to the motor vehicle and to hold said protective device in the upright use position, said connecting device including an upper fastening device and a lower fastening device, said upper fastening device being assigned to a vehicle roof and said lower fastening device permitting a pivoting of said restraining element and being assigned to the vehicle seat, said lower fastening device having at least one first fitting being a bearing bracket for being attached fixedly to the motor vehicle, and at least one second fitting being a lock disposed on said restraining element, said lower fastening device having a locking device for locking said restraining element in the lockable rest position and a clamping device for keeping said restraining element clamped with said upper fastening device, in the upright use position, said locking device having an interlocking means between said first and second fittings of said lower fastening device, said clamping device having a spring device and clamping element movable counter to a force of said spring device and being part of said second fitting, said first fitting of said lower fastening device forming an abutment of said clamping device, said clamping element being in engagement with said first fitting when said restraining element takes up the upright use position, said clamping element being in engagement with said first fitting of said lower fastening device when said restraining element takes up the rest position, said clamping element forming a securing element of said locking device.

2. The protective device according to claim 1, wherein said restraining element is oriented approximately horizontally in the lockable rest position.

3. The protective device according to claim 1, wherein said upper fastening device has at least one first fitting to be attached fixedly to the motor vehicle, and at least one second fitting disposed on said restraining element.

4. The protective device according to claim 3, wherein:
said at least one first fitting of said upper fastening device is a suspension device; and
said at least one second fitting of said upper fastening device is an eyelet.

5. The protective device according to claim 1, wherein said interlocking means has a damping coating.

6. The protective device according to claim 1, wherein said clamping element keeps said interlocking means in engagement and thus constitutes a securing device of said locking device.

7. The protective device according to claim 1, wherein said interlocking means is formed on said first fitting by a receptacle and on said second fitting by an engagement element, said engagement element projects into said receptacle in the rest position of said restraining element.

8. The protective device according to claim 1, wherein said clamping element is a slide.

9. The protective device according to claim 1, wherein said second fitting of said lower fastening device is configured as a lock with a lock housing in which said clamping element is mounted such that said clamping element can be pulled out counter to the force of said spring device.

10. A protective device for vehicle occupants of a motor vehicle, the protective device comprising:
a restraining element to be disposed between a vehicle seat and a vehicle interior space situated behind the vehicle seat, said restraining element serving to receive a load, and being pivotable between an upright use position and a lockable rest position; and
a connecting device disposed on said restraining element, said connecting device connecting said protective device releasably to the motor vehicle and to hold said protective device in the upright use position, said connecting device including an upper fastening device and a lower fastening device, said upper fastening device being assigned to a vehicle roof and said lower fastening device permitting a pivoting of said restraining element and being assigned to the vehicle seat, said lower fastening device having at least one first fitting for being attached fixedly to the motor vehicle, and at least one second fitting disposed on said restraining element, said lower fastening device having a locking device for locking said restraining element in the lockable rest position and a clamping device for keeping said restraining element clamped with said upper fastening device, in the upright use position, said clamping device having a spring device and clamping element movable counter to a force of said spring device and being part of said second fitting;
said second fitting of said lower fastening device being configured as a lock with a lock housing in which said clamping element is mounted such that said clamping element can be pulled out counter to the force of said spring device;
said lock having a movable handle for actuating said clamping element, such that said clamping element is optionally movable counter to said spring device into a release position, in which said clamping element partially protrudes out of said lock housing, and into a locking position, in which said clamping element is pulled into said lock housing by said spring device, as a result of which said restraining element is kept clamped in the upright use position or is locked in the lockable rest position by said locking device.

11. A protective device for vehicle occupants of a motor vehicle, the protective device comprising:
a restraining element to be disposed between a vehicle seat and a vehicle interior space situated behind the vehicle seat, said restraining element serving to receive a load, and being pivotable between an upright use position and a lockable rest position, said restraining element being a lattice structure surrounded by a rigid frame; and
a connecting device disposed on said restraining element, said connecting device connecting said protective device releasably to the motor vehicle and to hold said protective device in the upright use position, said connecting device including an upper fastening device and a lower fastening device, said upper fastening device being assigned to a vehicle roof and said lower fastening device permitting a pivoting of said restraining element and being assigned to the vehicle seat, said lower fastening device having a locking device for locking said restraining element in the lockable rest position and a clamping device for keeping said restraining element clamped with said upper fastening device, in the upright use position.

12. The protective device according to claim 11, wherein said lower fastening device has at least one first fitting to be attached fixedly to the motor vehicle, and at least one second fitting disposed on said restraining element.

13. The protective device according to claim 12, wherein said clamping device has a spring device and clamping element which is movable counter to a force of said spring device and is part of said second fitting.

14. The protective device according to claim 13, wherein said first fitting of said lower fastening device forms an abutment of said clamping device, and said clamping element is in engagement with said first fitting when said restraining element takes up the upright use position.

15. The protective device according to claim 13, wherein said clamping element is in engagement with said first fitting of said lower fastening device when said restraining element takes up the rest position, said clamping element forming a securing element of said locking device.

16. The protective device according to claim 13, wherein said locking device has an interlocking means between said first and second fittings of said lower fastening device.

17. The protective device according to claim 12, wherein:
said at least one first fitting is a bearing bracket; and
said at least one second fitting is a lock.

* * * * *